United States Patent [19]

Shimizu et al.

[11] Patent Number: 5,034,478
[45] Date of Patent: Jul. 23, 1991

[54] METHOD OF PREVENTING POLYMER SCALE FORMATION

[75] Inventors: Toshihide Shimizu, Urayasu; Ichiro Kaneko; Mikio Watanabe, both of Ibaraki, all of Japan

[73] Assignee: Shin-Etsu Chemical Co., Ltd., Tokyo, Japan

[21] Appl. No.: 446,699

[22] Filed: Dec. 6, 1989

[30] Foreign Application Priority Data

Dec. 7, 1988 [JP] Japan .................................. 63-309416

[51] Int. Cl.$^5$ ................................................ C08F 2/00
[52] U.S. Cl. ...................................... 526/62; 526/194; 526/210; 526/219.1; 526/233; 422/131
[58] Field of Search .............. 526/62, 194, 210, 219.1, 526/233; 422/131

[56] References Cited

U.S. PATENT DOCUMENTS 4,105,839  8/1978  Koyanagi et al. ..................... 526/62
4,622,245  11/1986  Shimizu et al. ........................ 526/62

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A method of preventing polymer scale deposition in polymerization of a monomer having an ethylenically double bond, wherein said polymerization is carried out in a polymerization vessel in which its inner wall surface has been previously coated with a coating solution comprising:

(A) a condensate of a phenolic hydroxy group-containing compound, (B) at least one member selected from the group consisting of metal compounds and inorganic colloids, and (C) at least one member selected from the group consisting of dyes and pigments. This method makes it possible to prevent polymer scale deposition regardless of polymerization conditions such as the kind of monomers, the type of polymerization vessel, etc.

23 Claims, No Drawings

METHOD OF PREVENTING POLYMER SCALE FORMATION

BACKGROUND OF THE INVENTION

1. Field of the Invention

The present invention relates to a method of preventing polymer scale from depositing on the inner wall of a polymerization vessel during the polymerization of a monomer having an ethylenically double bond.

2. Description of Prior Art

In processes of preparing polymers by polymerizing monomers in a polymerization vessel, the problem that polymers deposit on the inner wall and other parts which come into contact with monomers such as a stirring shaft and stirring blades of the polymerization vessel in the form of scale, is known. The deposition of the polymer scale on the inner wall of the polymerization vessel results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomers, there is a danger that the workers may be exposed to the unreacted monomers, which may give them some physical disorders.

Various attempts have been made to prevent the polymer scale from depositing on the inner wall of a polymerization vessel. The following art methods are known.

(1) The method disclosed in Japanese Patent Publication (KOKOKU) No. 30845/1970, in which a dye or a pigment is coated on the inner wall of a polymerization vessel.

(2) The method disclosed in Japanese Patent Publication (KOKOKU) No. 24953/1977 in which a polar organic compound or a dye treated with a metal salt is coated on the inner wall.

(3) The method disclosed in Japanese Patent Publication (KOKOKU) NO. 28347/1978 in which a mixture of an electron donor compound and an electron acceptor compound is coated on the inner wall.

(4) The method disclosed in Japanese Patent Publication (KOKOKU) No. 24070/1977 in which an inorganic salt or an inorganic complex is coated on the inner wall.

(5) The method disclosed in Japanese Patent Publication (KOKOKU) Nos. 11561/1982, 3841/1987 and 59246/1985, and Japanese Pre-examination Patent Publication (KOKAI) No. 192413/1982 in which a condensate of a phenol is coated on the wall.

However, in these prior art methods, the effect of preventing the polymer scale formation varies according to polymerization conditions such as the kind of a monomer to be polymerized, the ratio of materials charged in the polymerization vessel, the kind of a polymerization catalyst used, a form of the polymerization and the material constituting the inner wall of the polymerization vessel. As a result, it is difficult to prevent effectively and certainly polymer scale deposition in every case. Particularly, in the case of polymerization of styrene, styrene-butadiene, acrylonitrile-butadiene-styrene or the like in a stainless steel polymerization vessel, serious polymer scale deposits; hence a glass-lined polymerization vessel must be used. However, the glass-lined polymerization vessel has disadvantages that its wall, etc. has a small heat conductivity and poor durability, and that a large polymerization vessel is difficult to produce.

SUMMARY OF THE INVENTION

It is accordingly an object of this invention to provide a method which can prevent polymer scale deposition effectively and certainly, irrespective of polymerization conditions.

The present inventors have discovered that the above object can be achieved by applying a coating solution containing three specific compounds to the inner wall, etc. of a polymerization vessel.

Thus, according to this invention, there is provided a method of preventing polymer scale deposition during polymerization of a monomer having an ethylenically double bond, wherein said polymerization is carried out in a polymerization vessel in which its inner wall surface has been previously coated with a coating solution comprising:

(A) a condensate of a phenolic hydroxy group containing compound, (B) at least one member selected from the group consisting of metal compounds and inorganic colloids, and (C) at least one member selected from the group consisting of dyes and pigments.

The present invention also provides a polymer scale preventive agent comprising said components (A), (B) and (C).

Further, the present invention provides a polymerization vessel of which the inner wall has a coating comprising said components (A), (B) and (C).

The method of the present invention makes it possible to effectively and certainly prevent polymer scale from depositing on the inner wall, etc. of a polymerization vessel irrespective of polymerization conditions in the polymerization of a monomer having an ethylenically double bond. Further, the polymerizations which must be carried out using a glass lined polymerization vessel so far, can be also carried out in ordinary polymerization vessels made of stainless steel; this is a great advantage commercially. Still further, the present method makes it possible to use a polymerization vessel continuously for a number of polymerization runs without cleaning operation.

DETAILED DESCRIPTION OF THE INVENTION

The coating solution used in the method of this invention comprises the components (A), (B) and (C).

Component (A)

The component (A), a condensate of a phenolic hydoxyl group-containing compound, may be exemplified by the following compounds.

I. The condensates disclosed in Japanese Patent Publication (KOKOKU) No. 3841/1987, which is incorporated herein by reference. That is, (1) a self-condensation product of a polyhydric phenol such as a dihydric or trihydric phenol, (2) a condensation product of two or more kinds of polyhydric phenols such as dihydric or trihydric phenols, and (3) a self-condensation product of a polyhydric naphthol.

The polyhydric phenol include, for example, dihydric phenols such as resorcinol, hydroquinone, and catechol, and trihydric phenols such as phloroglucinol and pyrogallol. The polyhydric phenol includes, for example, 2,7-dihydroxynaphthalene, 3,7-dihydroxynaphthalene and 2,6-dihydroxynaphthalene. Preferred are the self-condensation products and co-condensation products of resorcinol and hydroxyhydroquinones, and self-condensation products of pyrogallol.

These condensates can be prepared by heating one or more of polyhydric phenols or a polyhydric naphthol at about 210° C. to about 310° C. in an inert atmosphere such as nitrogen or argon for about 10 to 500 min. or 8 hours. For the reaction, various catalysts can be used, such as zinc chloride, aluminum chloride, sodium hydroxide and the like. The catalyst is usually present in an amount of about 0.05 to 0.50 mole per mole of the reactants. The preparation process is described in more detail in Japanese Patent Publication (KOKOKU) No. 3841/1987.

II. The reaction product of pyrogallol and an aldhyde disclosed in Japanese Patent Publication (KOKOKU) No. 59246/1985, which is incorporated herein by reference, containing a unit in its molecular represented by the general formula:

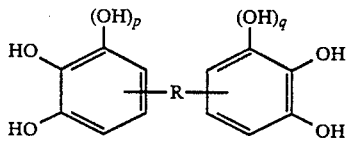

Wherein R represents a divalent hydrocarbon group having from 1 to 30 carbon atoms, and p and q are an integer of 0 or 1;

The reaction product is exemplified by those having the following units: 1,1-bis(2,3,4-trihydroxyphenyl)-phenylmethane and 1,1-bis(2,3,4-trihydroxyphenyl)-decane.

Said reaction product can be prepared by reacting the pyrogallol compound having the general formula:

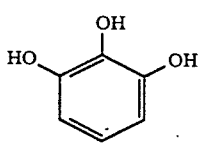

with a variety of aldehydes under the acidic conditions in an aqueous medium. The aldehyde used includes, for example, aliphatic aldehydes such as decyl aldehyde and formaldehyde, and aromatic aldehydes such as benzaldehyde and ones having various substituents such as a methyl group and ethyl group on the benzene ring. The aromatic aldehydes are preferred. The aldehyde is used in an amount of 0.1 to 1 mole per mole of pyrogallol. The conditions of preparation are described in more detail in Japanese Patent Publication (KOKOKU) NO. 59246/1985.

III. The condensate of pyrogallol or a hydroxyhydroquinone with an aromatic aldhyde disclosed in Japanese Pre-examination Patent Publication (KOKAI) No. 192413/1982, which is incorporated herein by reference, and represented by the general formula:

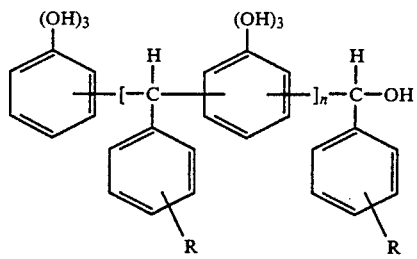

wherein, R represents a hydrogen atom or an alkyl group having 1 to 10 carbon atoms and n is an integer of 0 or more.

This condensate can be obtained by allowing pyrogallol or hydroxyhydroquinone and an aromatic aldehyde to condensate under acidic conditions in an aqueous medium or an organic solvent at a temperature of 40° C. to 120° C. to form a reaction product, and then subjecting the reaction product to extraction treatment with an ether to separate an unsoluble portion, which is subjected to extraction treatment with a polar solvent such as methanol, ethyl acetate or the like. The aldehyde used includes, for example, benzaldehyde and its derivatives having a substituent such as a methyl group or an ethyl group. The aromatic aldehyde is usually used in an amount of about 0.1 to 10 moles per mole of the pyrogallol or the hydroxyhydroquinone. The other preparation conditions are described in more detail in Japanese Pre-examination Patent Publication (KOKAI) No. 192413/1982.

Said condensate includes, for example, the condensate of pyrogallol with benzaldehyde, and the condensate of a hydroxyhydroquinone with benzaldehyde, and the condensate of pyrogallol with formaldehyde.

IV. The compound disclosed in Japanese Patent Publication (KOKOKU) No. 11561/1982 and International Patent Publication WO80/00801, which are incorporated herein by reference, and represented by the formula:

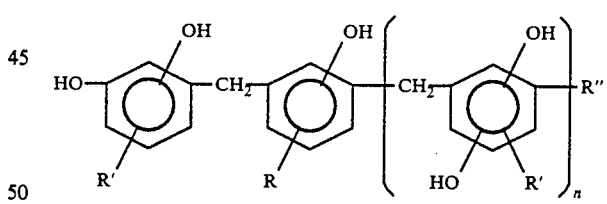

wherein R represents a halogen atom or an alkyl group having 1 to 4 carbon atoms, R' represents a member selected from the group consisting of a hydrogen atom, a halogen atom, a hydroxyl group and alkyl groups having 1 to 4 carbon atoms, R" represents a member selected from the group consisting of a hydrogen atom and the group: —$CH_2OH$, and n is an integer of from 1 to 20.

This compound can be prepared from a halogen- or alkyl-substituted phenol such as p-chlorophenol, p-cresol and p-ethylphenol, a condensing agent such as formaldehyde and acetaldehyde, and a polyhydric phenol such as resorcinol, hydroquinone, catechol and phloroglucinol. For example, p-chlorophenol is reacted with formaldehyde in an aqueous solution to form bis-2,5-(hydroxymethyl)-4-chlorophenol, to which resorcinol is then added, followed by reaction to produce a desired trimer, a tetramer, a pentamer, etc. which are linked by methylene linkages. The preparation process is described in more detail in Japanese Patent Publication (KOKOKU) No. 11561/1982.

Among the condensates exemplified above, preferred are the condensates described in I and II.

The condensates described above can be used singly or in combination of two or more as the component (A).

Component (B)

The component (B) of the coating solution used in the present invention comprises at least one member selected from the group consisting of metal compounds and inorganic colloids.

The metal compounds include, for example, a variety of salts; silicates, carbonates, phosphates, sulfates, nitrates, borates, acetates, hydroxides, oxides and halides of metal, e.g., alkaline metals such as sodium and potassium; alkaline earth metals such as magnesium, calcium and barium; aluminum family metals such as aluminum; tin family metals such as titaniun and tin; iron family metals such as iron and nickel; chromium family metals such as chromium and molybdenum; manganese family metals such as manganese; copper family metals such as copper; and silver, platinum family metals such as platinum. These metal compounds may be used singly or in combination of two or more.

The inorganic colloids which may be used for the component (B) include, for example, gold colloid, silver colloid, sulfur colloid, ferric hydroxide colloid, colloid of stannic acid, colloid of silicic acid, colloid of manganese dioxide, colloid of molybdenum oxide, colloid of barium sulfate, colloid of vanadium pentoxide, colloid of aluminum hydroxide, colloid of lithium silicate and so on. These inorganic colloids can be prepared, for example, by mechanical crushing, irradiation with ultrasonic wave, electrical dispersion or chemical methods. These inorganic colloids may be used singly or in combination of two or more. Either of or both of the metal compound and the inorganic colloid can be used as the component (B).

Among the metal compounds and the inorganic colloids, preferred are silicates of magnesium, calcium, aluminum and titanium; phosphates of magnesium, calcium, barium and titanium; sulfates of titanium, tin, iron and nickel; and hydroxides of magnesium, calcium, aluminum and iron; and colloid of ferric hydroxide, colloid of aluminum hydroxide, colloid of stannic acid, colloid of silicic acid, colloid of aluminum hydroxide, and colloid of lithium silicate.

Component (C)

The component (C) of the coating solution is comprised of at least one member selected from the group consisting of dyes and pigments.

The dyes and pigments which may be used as the component (C) are exemplified by the following.

Azo dyes such as monoazo and polyazo dyes and pigments, metal complex azo dyes and pigments, stilbene azo pigments, and thiazole azo dyes;

anthraquinone dyes and pigments such as anthraquinone derivatives, and anthrone derivatives;

indigoid dyes and pigments such as indigo derivatives, and thioindigo derivatives;

phthalocyanine dyes and pigments;

carbonium dyes and pigments such as diphenylmethane dyes, triphenylmethane dyes and pigments, xanthene dyes, and acridine dyes;

quinoneimine dyes such as azine dyes, oxazine dyes, and thiazine dyes;

methine dyes such as polymethine or cyanine dyes;
quinoline dyes;
nitro dyes;
benzoquinone and naphthoquinone dyes;
naphthalimide dyes and pigments;
perinone dyes;
sulfide dyes;
fluorescent dyes;
azoic dyes; and
reactive dyes.

These can be used either singly or in combination of two or more. Of these dyes and pigments as exemplified above, particularly preferred are azine dyes. More specifically, typical examples of these dyes and pigments are enumerated below.

(1) Azo dyes and pigments include the following compounds. Exemplary monoazo and polyazo dyes are C.I. Basic Yellow 32, 34 and 36; C.I. Basic Orange 2, 32, 33 and 34; C.I. Basic Red 17, 18, 22, 23, 24, 32, 34, 38, 39 and 40; C.I. Basic Violet 26 and 28; C.I. Basic Blue 58, 59, 64, 65, 66, 67 and 68; C.I. Basic Brown 1, 4, 11 and 12; C.I. Basic Black 8; C.I. Azoic Diazo Component 4, 21, 27 and 38; C.I. Disperse Yellow 3, 4, 5, 7, 8, 23, 50, 60, 64, 66, 71, 72, 76, 78 and 79; C.I. Disperse Orange 1, 3, 5, 13, 20, 21, 30, 32, 41, 43, 45, 46, 49, 50 and 51; C.I. Disperse Red 1, 5, 7, 12, 13, 17, 43, 52, 54, 56, 58, 60, 72, 73, 74, 75, 76, 80, 82, 84, 88, 90, 97, 99, 101, 103, 113, 117, 122, 125, 126, 128 and 129; C.I. Disperse Violet 10, 24, 33, 38, 41, 43 and 96; C.I. Disperse Blue 85, 92, 94 and 106; C.I. Disperse Brown 3 and 5; C.I. Disperse Black 1, 2, 10, 26, 27, 28, 29, 30 and 31; C.I. Solvent Yellow 2, 6, 14, 15, 16, 19, 21 and 56; C.I. Solvent Orange 1, 2, 5, 6, 14 and 45; C.I. Solvent Red 1, 3, 23, 24, 25, 27 and 30; C.I. Solvent Brown 3, 5 and 20; C.I. Solvent Black 3; C.I. Pigment Yellow 1, 2, 3, 4, 5, 6, 7, 10, 11, 12, 13, 14, 15, 16, 17, 23, 65, 73 and 83; C.I. Pigment Orange 1, 2, 5, 13, 14, 15, 16, 17, 24 and 31; C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 112, 114 and 163; C.I. Pigment Blue 25; C.I. Pigment Green 10; C.I. Pigment Brown 1 and 2; C.I. Pigment Black 1; C.I. Direct Yellow 1, 8, 11, 12, 24, 26, 27, 28, 33, 44, 50, 58, 85, 86, 87, 88, 89, 98, 100 and 110; C.I. Direct Orange 1, 6, 8, 10, 26, 29, 39, 41, 49, 51, 57, 102 and 107; C.I. Direct Red 1, 2, 4, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; C.I. Direct Violet 1, 7, 9, 12, 22, 35, 51, 63, 90, 94 and 98; C.I. Direct Blue 1, 2, 6, 8, 15, 22, 25, 71, 76, 77, 78, 80, 120, 123, 158, 160, 163, 165, 168, 192, 193, 194, 195, 196, 203, 207, 225, 236, 237, 246, 248 and 249; C.I. Direct Green 1, 6, 8, 28, 30, 31, 33, 37, 59, 63, 64 and 74; C.I. Direct Brown 1A, 2, 6, 25, 27, 44, 58, 59, 101, 106, 173, 194, 195, 209, 210 and 211; C.I. Direct Black 17, 19, 22, 32, 38, 51, 56, 71, 74, 75, 77, 94, 105, 106, 107, 108, 112, 113, 117, 118, 132, 133 and 146; C.I. Acid Yellow 11, 17, 19, 23, 25, 29, 36, 38, 40, 42, 44, 49, 61, 70, 72, 75, 76, 78, 79, 110, 127, 131, 135, 141, 142, 164, and 165; C.I. Acid Orange 1, 7, 8, 10, 19, 20, 24, 28, 33, 41, 43, 45, 51, 56, 63, 64, 65, 67 and 95; C.I. Acid Red 1, 6, 8, 9, 13, 14, 18, 26, 27, 32, 35, 37, 42, 57, 75, 77, 85, 88, 89, 97, 106, 111, 114, 115, 117, 118, 119, 129, 130, 131, 133, 134, 138, 143, 145, 154, 155, 158, 168, 249, 252, 254, 257, 262, 265, 266, 274, 276, 282, 283 and 303; C.I. Acid Violet 7, 11, 97 and 106; C.I. Acid Blue 29, 60, 92, 113, 117 and 120; C.I. Acid Green 19, 20 and 48; C.I. Acid Brown 2, 4, 13, 14, 20, 53, 92, 100, 101, 236, 247, 266, 268, 276, 277, 282, 289, 301 and 302; C.I. Acid Black 1, 7, 24, 26, 29, 31, 44, 76, 77, 94, 109 and 110; C.I. Mordant Yellow 1, 3, 5, 23, 26, 30, 38 and 59; C.I. Mordant Orange 1, 4, 5, 6, 8, 29 and 37; C.I. Mordant Red 7, 9, 17, 19, 21, 26, 30, 63 and 89; C.I. Mordant Violet 5 and 44; C.I. Mordant Blue 7, 13, 44, 75 and 76; C.I. Mordant Green 11, 15, 17 and 47; C.I. Mordant Brown 1, 14, 15, 19, 21, 33, 38, 40, 52 and 87; C.I. Mordant Black 1, 3, 7, 9, 11, 17, 26, 32, 38, 43, 44, 51, 54, 65, 75, 77, 84, 85, 86 and 87; C.I. Food Yellow 3 and 4; C.I. Food Red 7 and 9;

exemplary metal complex azo dyes are C.I. Solvent Yellow 61 and 80; C.I. Solvent Orange 37, 40 and 44; C.I. Solvent Red 8, 21, 83, 84, 100, 109 and 121; C.I. Solvent Brown 37; C.I. Solvent Black 23; C.I. Acid Black 51, 52, 58, 60, 62, 63, 64, 67, 72, 107, 108, 112, 115, 118, 119, 121, 122, 123, 131, 132, 139, 140, 155, 156, 157, 158, 159 and 191; C.I. Acid Yellow 59, 98, 99, 111, 112, 114, 116, 118, 119, 128, 161, 162 and 163; C.I. Acid Orange 74, 80, 82, 85, 86, 87, 88, 122, 123 and 124; C.I. Acid Red 180, 183, 184, 186, 194, 198, 199, 209, 211, 215, 216, 217, 219, 256, 317, 318, 320, 321 and 322; C.I. Acid Violet 75 and 78; C.I. Acid Blue 151, 154, 158, 161, 166, 167, 168, 170, 171, 175, 184, 187, 192, 199, 229, 234 and 236; C.I. Acid Green 7, 12, 35, 43, 56, 57, 60, 61, 65, 73, 75, 76, 78 and 79; C.I. Acid Brown 19, 28, 30, 31, 39, 44, 45, 46, 48, 224, 225, 226, 231, 256, 257, 294, 295, 296, 297, 299 and 300; C.I. Direct Yellow 39; C.I. Direct Violet 47 and 48; C.I. Direct Blue 90, 98, 200, 201, 202 and 226; C.I. Direct Brown 95, 100, 112 and 170;

an exemplary stilbene azo dye is C.I. Direct Black 62; and exemplary thiazole azo dyes are C.I. Direct Red 9 and 11.

(2) Anthraquinone dyes and pigments include the following compounds.

Exemplary anthraquinone derivatives are C.I. Basic Violet 25; C.I. Basic Blue 21, 22, 44, 45, 47, 54 and 60; C.I. Azoic Diazo Component 36; C.I. Vat Yellow 2, 3, 10, 20, 22 and 33; C.I. Vat Orange 13 and 15; C.I. Vat Red 10, 13, 16, 31, 35 and 52; C.I. Vat Violet 13 and 21; C.I. Vat Blue 4, 6, 8, 12, 14, 64, 66, 67 and 72; C.I. Vat Green 8, 13, 43, 44 and 45; C.I. Vat Brown 1, 3, 22, 25, 39, 41, 44, 46, 57, 68, 72 and 73; C.I. Vat Black 8, 14, 20, 25, 27, 36, 56, 59 and 60; C.I. Disperse Orange 11; C.I. Disperse Red 4, 9, 11, 15, 53, 55, 65, 91, 92, 100, 104, 116 and 127; C.I. Disperse Violet 1, 4, 8, 23, 26, 28, 30 and 37; C.I. Disperse Blue 1, 3, 5, 6, 7, 20, 26, 27, 54, 55, 56, 60, 61, 62, 64, 72, 73, 75, 79, 81, 87, 90, 91, 97, 98, 99, 103, 104 and 105; C.I. Disperse Yellow 51; C.I. Solvent Violet 13 and 14; C.I. Solvent Blue 11, 12, 35 and 36; C.I. Solvent Green 3; C.I. Pigment Red 83 and 89; C.I. Pigment Blue 22; C.I. Acid Violet 31, 34, 35, 41, 43, 47, 48, 51, 54, 66 and 68; C.I. Acid Blue 23, 25, 27, 40, 41, 43, 45, 54, 62, 72, 78, 80, 82, 112, 126, 127, 129, 130, 131, 138, 140, 142, 143, 182, 183, 203, 204 and 205; C.I. Acid Green 25, 27, 28, 36, 40, 41 and 44; C.I. Acid Brown 27; C.I. Acid Black 48 and 50; C.I. Mordant Red 3 and 11; C.I. Mordant Blue 8 and 48; C.I. Mordant Black 13; C.I. Pigment Violet 5;

exemplary anthrone derivatives are C.I. Vat Yellow 1 and 4; C.I. Vat Orange 1, 2, 3, 4 and 9; C.I. Vat Violet 1, 9 and 10; C.I. Vat Blue 18, 19 and 20; C.I. Vat Green 1, 2, 3 and 9; C.I. Vat Black 9, 13, 29 and 57; C.I. Vat Red 13; C.I. Acid Red 80, 82 and 83.

(3) Indigoid dyes and pigments include the following compounds.

Exemplary indigo derivatives are C.I. Vat Blue 1, 3, 5, 35 and 41; C.I. Reduced Vat Blue 1; C.I. Pigment Violet 19 and 122; C.I. Acid Blue 74 and 102; C.I. Solubilized Vat Blue 5 and 41; C.I. Solubilized Vat Black 1; C.I. Food Blue 1;

exemplary thioindigo derivatives are C.I. Vat Orange 5; C.I. Vat Red 1, 2 and 61; C.I. Vat Violet 2 and 3; C.I. Pigment Red 87 and 88; C.I. Vat Brown 3.

(4) Phthalocyanine dyes and pigments may include, for example, C.I. Solvent Blue 55; C.I. Pigment Blue 15, 16 and 17; C.I. Pigment Green 36, 37 and 38; C.I. Direct Blue 86 an 199; C.I. Mordant Blue 58.

(5) Carbonium dyes and pigments include the following compounds.

An exemplary diphenylmethane dye is C.I. Basic Yellow 2;

exemplary triphenylmethane dyes are C.I. Basic Red 9; C.I. Basic Violet 1, 3 and 14; C.I. Basic Blue 1, 5, 7, 19, 26, 28, 29, 40 and 41; C.I. Basic Green 1 and 4; C.I. Solvent Violet 8; C.I. Solvent Blue 2 and 73; C.I. Pigment Violet 3; C.I. Pigment Blue 1, 2 and 3; C.I. Pigment Green 1, 2 and 7; C.I. Direct Blue 41; C.I. Acid Violet 15 and 49; C.I. Acid Blue 1, 7, 9, 15, 22, 83, 90, 93, 100, 103 and 104; C.I. Acid Green 3, 9 and 16; C.I. Mordant Violet 1; C.I. Mordant Blue 1, 29 and 47; C.I. Food Violet 2; C.I. Food Blue 2; C.I. Food Green 2;

exemplary xanthene dyes are C.I. Basic Red 1; C.I. Solvent Red 49; C.I. Pigment Red 81 and 90; C.I. Pigment Violet 1, 2 and 23; C.I. Acid Red 51, 52, 87, 92 and 94; C.I. Mordant Red 15 and 27; C.I. Food Red 14; and exemplary acridine dyes are C.I. Basic Orange 14 and 15.

(6) Quinoimine dyes include the following compounds.

Exemplary azine dyes are C.I. Basic Red 2; C.I. Basic Black 2; C.I. Solvent Black 5 and 7; C.I. Acid Blue 59; C.I. Acid Black 2;

exemplary oxiazine dyes are C.I. Basic Blue 3; C.I. Direct Blue 106 and 108;

exemplary thiazine dyes are C.I. Basic Yellow 1; C.I. Basic Blue 9, 24 and 25.

(7) Methine dyes include the following compounds.

Exemplary polymethine (or cyanine) dyes are C.I. Basic Yellow 11, 13, 14, 19, 21, 25, 28, 33 and 35; C.I. Basic Orange 21 and 22; C.I. Basic Red 12, 13, 14, 15, 27, 29, 35, 36 and 37; C.I. Basic Violet 7, 15, 21 and 499 27.

(8) Quinoline dyes may be exemplified by C.I. Basic Green 6; C.I. Disperse Yellow 54 and 56; C.I. Solvent Yellow 33; C.I. Acid Yellow 3.

(9) Nitro dyes may be exemplified by C.I. Disperse Yellow 1, 33, 39, 42, 49 and 54; C.I. Acid Yellow 1.

(10) Benzoquinone and naphthoquinone dyes may be exemplified by C.I. Disperse Blue 58 and 108; C.I. Acid Brown 103, 104, 106, 160, 161, 165 and 188.

(11) Naphthalimide dyes and pigments may be exemplified by C.I. Pigment Red 123; C.I. Vat Violet 23 and 39; C.I. Acid Yellow 7.

(12) Perinone dyes may be exemplified by C.I. Vat Orange 7 and 15.

(13) Sulfide dyes may include, for example, C.I. Solubilized Sulfur Yellow 2; C.I. Sulfur Yellow 4; C.I. Sulfur Orange 3, C.I. Sulfur Red 2, 3, 5 and 7; C.I. Solubilized Sulfur Blue 15; C.I. Sulfur Blue 2, 3, 4, 6, 7, 9 and 13; C.I. Sulfur Green 2, 3, 6, 14 and 27; C.I. Solubilized Sulfur Brown 1 and 51; C.I. Sulfur Brown 7, 12, 15 and 31; C.I. Sulfur Black 1, 2, 5, 6, 10, 11 and 15; C.I. Vat Yellow 35, 42 and 43; C.I. Vat Blue 43 and 56.

(14) Fluorescent dyes may include, for example, C.I. Fluorescent brightening agents 14, 22, 24, 30, 32, 37, 45, 52, 54, 55, 56, 84, 85, 86, 87, 90, 91, 104, 112, 121, 134, 135, 153, 162, 163, 164, 166, 167, 168, 169, 170, 171, 172, 173, 174, 175, 176 and 177.

(15) Azoic dyes may include, for example, C.I. Azoic Diazo Component 17, 20, 22, 24, 26, 31, 35, 41, 47, 48, 109 and 121; C.I. Azoic Coupling Component 2, 3, 4, 5, 7, 8, 10, 11, 12, 14, 15, 16, 17, 18, 19, 20, 23, 26, 28, 29, 35, 36, 37, 41 and 108; C.I. Azoic Brown 2, 7, 11 and 15; C.I. Azoic Black 1 and 5; C.I. Azoic Yellow 1 and 2; C.I. Azoic Orange 2, 3 and 7; C.I. Azoic Red 1, 2, 6, 9, 16 and 24; C.I. Azoic Violet 1, 2, 6, 7, 9 and 10; C.I. Azoic Green 1.

(16) Reactive dyes may include, for example, C.I. Reactive Yellow 1, 2, 3, 4, 6, 7, 11, 12, 13, 14, 15, 16, 17, 18, 22, 23, 24, 25, 26, 27, 37 and 42; C.I. Reactive Orange 1, 2, 4, 5, 7, 13, 14, 15, 16, 18, 20, 23 and 24; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64; C.I. Reactive Violet 1, 2, 4, 5, 8, 9 and 10; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46; C.I. Reactive Green 5, 6, 7 and 8; C.I. Reactive Brown 1, 2, 5, 7, 8, 9, 10, 11, 14 and 16; C.I. Reactive Black 1, 3, 4, 5, 6, 8, 9, 10, 12, 13, 14 and 18.

Further, pigments may be exemplified by inorganic pigments such as Chrome Yellow, Zinc Yellow, ZTO type zinc chromate, red lead, iron oxide powder, zinc white, aluminum powder and zinc powder.

Among the above dyes and pigments, preferred are quinoneimine dyes. More preferred are azine dyes. In particular, C.I. Basic Red 2, C.I. Basic Black 2, C.I. Solvent Black 5 and 7, C.I. Acid Blue 5 and 9, and C.I. Acid Black 2 are most preferable examples.

Preparation of the coating solution

The coating solution used in the present method can be prepared by dissolving or dispersing the components (A), (B) and (C) in a suitable solvent. The total concentration of the components (A), (B) and (C) may be generally from about 0.01 % by weight to about 5 % by weight, preferably from 0.05 to 2 % by weight. The component (B) is normally present in an amount of from 1 to 500 parts by weight, preferably from 5 to 300 parts by weight per 100 parts by weight of the component (A}, and the component (C) is present in an amount of from 5 to 400 parts by weight, preferably from 15 to 250 parts by weight per 100 parts by weight of the component (A).

According to the method of the present invention, the use of the components (A), (B) and (C) in combination is essential in order to prevent polymer scale deposition effectively and certainly. However, if the component (B) is present in too large or small an amount in the coating solution relative to that of the component (A), the scale preventing effect base on the combined use of components (A) and (B) may not be achieved. If the component (C) is present in too large or small an amount in the coating solution with respect to the component (A), a coating with adequate durability may not be formed.

In preparing the coating solution in the present method, there is no limitation on the order of the dissolving or dispersing of the components (A), (B) and (C) in a solvent; the three components may be dissolved or dispersed stimulanously or one by one. Any other orders are acceptable.

The solvent used for preparation of the coating solution include, for example, water; alcohols such as methanol, ethanol, propanol, 1-butanol, 2-butanol, 2-methyl-1-propanol, 2-methyl-2-propanol, 3-methyl-1-butanol, and 2-methyl-2-butanol, 2-pentanol; aliphatic hydrocarbons such as n-hexane, n-heptane and the like; aromatic hydrocarbons such as benzene, toluene, and xylene; halogenated hydrocarbons such as chloroethylene, 1-chlorobutane, chloropentane, dichloroethylene, and 1,1,2-trichloroethane; ketones such as acetone, methyl ethyl ketone, and methyl isobutyl ketone; esters such as methyl formate, ethyl formate, methyl acetate, and methyl acetoacetate; ethers such as 4-methyldioxolan, and ethyleneglycol diethyl ether; furans; and aprotic solvents such as dimethylformamide, dimethyl sulfoxide, and acetonitrile. These solvents are appropriately used singly or as a mixed solvent of two or more.

Formation of coating

The coating solution is applied to the inner wall surface of the polymerization vessel, followed by drying to form a coating comprising the scale preventive agent. Drying may be carried out, for example, at a temperature of from room temperature to 100° C. The coating solution is preferably applied to other parts of the polymerization vessel with which the monomer comes into contact during polymerization, in addition to the inner wall. Such parts include, for example, stirring blades, a stirring shaft, a condenser, a header, baffles, search coils, bolts, nuts, etc.

Moreover, preferably, the coating solution is also applied to parts of recovery system for an unreacted monomer with which the unreacted monomer may come into contact, for example, the inner surfaces of monomer distillation columns, condensers, monomer stock tanks and so forth. Scale formation can be thereby prevented at these parts.

The method of applying the coating solution is not particularly limited, and includes typically the brush coating, spray coating, the method of filing the polymerization vessel with the coating solution followed by withdrawal thereof, and the automatic coating methods as disclosed in Japanese Pre-examination Publication (KOKAI) Nos. 61001/1982, 36288/1980 and 11303/1984, Japanese Pre-examination Publication (KOHYO) Nos. 501116/1981 and 501117/1981. The method of drying wet coated surfaces is not limited, either. Following methods can be used. For example, a method in which, after the solution is applied, air heated to a suitable temperature is blown to the wet coated surface to dry it, and a method in which the inner wall surface of a polymerization vessel and other parts with which the monomer comes into contact during polymerization are previously heated, and the coating solution is applied on the heated inner wall surface, etc. After dried, the coated surfaces are washed with water if necessary.

The coating thus formed has normally a coating weight of at least 0.001 g/m$^2$, preferably from 0.001 to 5 g/m$^2$, and more preferably 0.05 to 2 g/m$^2$.

The coating operation may be conducted every polymerization run or every several polymerization runs as necessary, thereby the polymerization vessel can be used repeatedly without deposition of polymer scale.

Polymerization

After the formation of the coating on the inner wall surface of a polymerization vessel, etc., polymerization is carried out in accordance with conventional procedures. That is, a monomer having an ethylenically double bound, a polymerization initiator, and other necessary additives such as a dispersing agent for the monomer, and optionally a polymerization medium may be charged into the polymerization vessel, followed by carrying out polymerization according to conventional manner.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or esters of salts of these; maleic acid or fumaric acid, and esters or anhydrides thereof; and diene monomers such as butadiene, chloroprene and isoprene; as well as styrene, α-methylstyrene, acrylates, acrylonitrile, halogenated vinylidenes, and vinyl ethers.

There are no particular limitations on the form of the polymerization to which the method of this invention can be applied. The invention is effective in any forms of polymerization such as suspension polymerization, emulsion polymerization, solution polymerization and bulk polymerization.

More specifically, in the case of suspension or emulsion polymerization, polymerization is generally carried out by a process comprising the steps of charging water and a dispersing agent into a polymerization vessel, charging a polymerization initiator, evacuating the inside of the polymerization vessel to a pressure of from about 30 mmHg to about 760 mmHg, charging a monomer (the pressure inside the polymerization vessel usually become from 10 to 30 kg.cm$^{-2}$), polymerizing the monomer at a temperature of from about $-10°$ C. to $150°$ C., and optionally adding at least one of water, the dispersing agent and polymerization initiator during polymerization. The polymerization is judged to be completed when the pressure inside the vessel falls to from about 0 to about 7 kg.cm$^{-2}$G. The water, dispersing agent and polymerization initiator are used in amounts of about 20 to about 300 parts by weight, about 0.01 to about 30 parts by weight, and about 0.01 to about 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those as described for suspension or emulsion polymerization.

In the case of bulk polymerization, the process typically comprises the steps of evacuating the inside of a polymerization vessel to a pressure of from about 0.01 mmHg to about 760 mmHg, charging a monomer, and then charging a polymerization initiator, and then carrying out polymerization at $-10°$ C. to $250°$ C.

The method of this invention is effective regardless of the materials constituting the inner wall, etc. of a polymerization vessel. That is, this method is effective for any type of polymerization vessels having inner wall made of stainless steel or glass for lining.

Accordingly, any additive materials that are commonly added in a polymerization system can be used without any limitation. More specifically, the method of this invention can effectively prevent polymers from sticking, even in polymerization systems in which such additives are present as exemplified by suspension agents such as partially saponified polyvinyl alcohol, methyl cellulose and polyacrylate; solid dispersants such as calcium phosphate and hydroxyapatite; anionic emulsifying agents such as sodium lauryl sulfate, sodium dodecylbenzenesulfonate and sodium dioctylsulfosuccinate; nonionic emulsifying agents such as sorbitan monolaurate and polyoxyethylene alkyl ether; fillers such as calcium carbonate and titanium oxide; stabilizers such as tribasic lead sulfate, calcium stearate, dibutyltin dilaurate and dibutyltin mercaptide; lubricants such as rice wax and stearic acid; plasticizers such as DOP and DBP; chain transfer agents such as trichloroethylene and mercaptans; pH adjusters; and polymerization catalysts such as diisopropyl peroxydicarbonate, α,α'-azobis-2,4-dimethylvaleronitrile, lauroyl peroxide, potassium persulfate, cumene hydroperoxide and p-menthane hydroperoxide.

The polymerization for which the method of this invention can be particularly suitably carried out include, for example, suspension polymerization or emulsion polymerization of vinyl halides such as vinyl chloride or vinylidene halides or a monomer mixture mainly comprised of any of these. The method is also suited to polymerizations for which polymerization vessels made of stainless steel are mainly used, for example, polymerizations for preparing beads or latexes of polymers such as polystyrene, polymethyl methacrylate and polyacrylonitrile, preparing synthetic rubbers such as SBR, NBR, CR and IIR (these synthetic rubbers are commonly prepared by emulsion polymerization), and preparing ABS resins.

EXAMPLES

The method of this invention will now be described by way of Examples and Comparative Examples. In each Table shown below, the experiments marked with an asterisk denote comparative examples, and the other experiments, working examples of this invention.

Preparation examples of condensates of phenolic hydroxyl group-containing compounds (1) Preparation of Condensate No.1

Pyrogallol (3 moles) was dissolved in 2 liters of water. Benzaldehyde (2 moles) and phosphoric acid (6 moles) were added to the solution of pyrogallol, and then the compounds were allowed to react at 100° C. for 4 hours.

The reaction mixture thus obtained was filters, and the product filtered off was washed with hot water 5 to 6 times, so that excessive phosphoric acid was removed. Thereafter, the product was dried to give Condensate No.1.

(2) Preparation of Condensate No.2

Resorcinol (440g) was charged in a reaction vessel, and was allowed to react at 300° C. for 8 hours in an atmosphere of nitrogen to produce Condensate No.2.

EXAMPLE 1

Using a polymerization vessel made of stainless steel having an inner capacity of 1,000 liter and equipped with a stirrer, polymerization was carried out in the following manner.

In each experiment, a component (A), component (B) and component (C) were dissolved in a solvent so that the concentration in total might become 0.5 % by weight to prepare a coating solution as shown in Table 1. Then, the coating solution was applied to the inner wall of the polymerization vessel and parts with which monomers come into contact during polymerization such as the stirring shaft, stirring blades, etc., and then heated at 50° C. for 30 minutes and dried. The coated surface was then washed with water to form a dry coating.

A condensate (Component (A)), a metal compound or inorganic colloid (Component (B)), a dye or pigment (Component(C)), weight ratio of the components (A)/(B)/(C) and the kind of solvent used are shown in Table 1. Experiment Nos 1 to 7 are comparative examples in which no coating solution was applied, or a coating solution containing only one or two of the components (A), (B) and (C) was applied.

In the polymerization vessel thus coated, 400 kg of water, 200 kg of vinyl chloride, 200 g of sorbitan monostearate, 200 g of hydroxypropylmethyl cellulose and 75 g of diisopropyl peroxydicarbonate were charged and then polymerization was carried out at 57° C. for 6 hours with stirring. After the polymerization was completed, the product polymer was taken out of the polymerization vessel, and then the inside of the polymerization vessel was washed with water. The procedure from applying the coating solution, charging the monomer, polymerizing to washing with water was repeated. The number of polymerization runs which could be repeated before the quantity of polymer scale depositing on the inner wall of the polymerization vessel exceeded 1 g/m², was measured.

The result was shown in Table 1.

EXAMPLE 2

A polymerization vessel with a inner capacity of 1,000 liter and having a stirrer was coated with a coating solution in the same manner as in Example 1. The condensate (Component (A)) and the metal compound or inorganic colloid (Component (B)) used, the dye or pigment (Component(C)), the weight ratio of the components (A)/(B)/(C) and the kind of solvent in each experiment are shown in Table 2. However, Experiment Nos.21 to 27 are comparative examples in which no coating solution was applied, or a coating solution containing only one or two of the components (A), (B) and (C) was applied.

In the polymerization vessel thus coated, 40 kg of water, 17 kg of vinyl chloride, 4 kg of vinyl acetate, 12 g of partially saponified polyvinyl alcohol, 4 g of hydroxypropylmethyl cellulose and 200 g of trichloroethylene were charged. Then, polymerization was carried out at 58° C. for 6 hours with stirring. After the polymerization was completed, the product polymer was taken out of the polymerization vessel, and then the inside of the polymerization vessel was washed with water. The procedure from applying the coating solution through charging the monomer and polymerizing to washing with water was repeated. The number of polymerization runs which could be repeated before the quantity of polymer scale depositing on the inner wall of the polymerization vessel exceeded 1 g/m² (No. of scale prevention runs), was measured.

The result was shown in Table 2.

TABLE 1

| | Coating solution | | | | | |
|---|---|---|---|---|---|---|
| Experiment No. | (A) Condensate of phenolic hydroxyl group-containing compound | (B) Metal salt or inorganic colloid | (C) Dye or pigment | (A)/(B)/(C) weight ratio | Solvent | Number of polymerization runs |
| 1* | — | — | — | — | — | 0 |
| 2* | 1 | — | — | 100/0/0 | Methanol | 0 |
| 3* | — | Silicate colloid | — | 0/100/0 | " | 0 |
| 4* | — | — | C.I. Acid Black 2 | 0/0/100 | " | 0 |
| 5* | 1 | Silicate colloid | — | 100/100/0 | " | 4 |
| 6* | 1 | — | C.I. Acid Black 2 | 100/0/50 | " | 5 |
| 7* | — | Silicate colloid | " | 100/50/0 | " | 1 |
| 8 | 1 | " | " | 100/50/50 | " | 21 |
| 9 | 1 | Lithium silicate colloid | " | 100/5/15 | " | 20 |
| 10 | 1 | Sulfur colloid | C.I. Solvent Black 5 | 100/250/30 | DMF | 18 |
| 11 | 1 | Manganese dioxide colloid | " | 100/10/250 | " | 21 |
| 12 | 1 | Copper sulfate | " | 100/300/20 | " | 15 |
| 13 | 1 | Aluminium hydroxide colloid | C.I. Acid Blue 161 | 100/100/100 | Methanol | 20 |
| 14 | 2 | " | " | 100/150/15 | " | 16 |
| 15 | 2 | " | C.I. Basic Blue 59 | 100/100/200 | " | 19 |
| 16 | 2 | Terric hydroxide colloid | C.I. Solvent Black 7 | 100/40/200 | " | 21 |
| 17 | 2 | Silicate colloid | " | 100/150/200 | " | 20 |
| 18 | 2 | " | C.I. Solvent Black 3 | 100/150/40 | " | 21 |
| 19 | 2 | Lithium silicate colloid | " | 100/50/30 | " | 20 |
| 20 | 2 | " | C.I. Acid Red 183 | 100/100/100 | " | 25 |

TABLE 2

| | Coating solution | | | | | |
|---|---|---|---|---|---|---|
| Experiment No. | (A) Condensate of phenolic hydroxyl group-containing compound | (B) Metal salt or inorganic colloid | (C) Dye or pigment | (A)/(B)/(C) weight ratio | Solvent | Number of polymerization runs |
| 21* | — | — | — | — | — | 0 |
| 22* | 2 | — | — | 100/0/0 | Methanol | 0 |
| 23* | — | Titanium sulfate | — | 0/100/0 | " | 0 |
| 24* | — | — | C.I. Acid Blue 161 | 0/0/100 | " | 0 |
| 25* | 2 | Titanium sulfate | — | 0/100/0 | " | 2 |
| 26* | 2 | — | C.I. Acid Blue 161 | 100/0/0 | " | 2 |
| 27* | — | Titanium sulfate | " | 0/70/30 | " | 1 |
| 28 | 2 | " | " | 100/70/30 | " | 19 |
| 29 | 2 | Vanadium pentoxide colloid | C.I. Acid Black 2 | 100/10/20 | " | 15 |
| 30 | 2 | Silicate colloid | C.I. Solvent Black 5 | 100/100/50 | DMF | 18 |
| 31 | 2 | Sulfur colloid | " | 100/200/150 | " | 15 |
| 32 | 2 | Aluminium hydroxide colloid | " | 100/50/200 | Methanol | 16 |

TABLE 2-continued

| | Coating solution | | | | | |
|---|---|---|---|---|---|---|
| Experiment No. | (A) Condensate of phenolic hydroxyl group-containing compound | (B) Metal salt or inorganic colloid | (C) Dye or pigment | (A)/(B)/(C) weight ratio | Solvent | Number of polymerization runs |
| 33 | 1 | " | C.I. Basic Orange 14 | 100/5/70 | " | 13 |
| 34 | 1 | " | C.I. Solvent Black 7 | 100/30/50 | " | 17 |
| 35 | 1 | Terric hydroxide colloid | " | 100/100/200 | " | 19 |
| 36 | 1 | " | C.I. Basic Red 18 | 100/50/200 | DMF | 12 |
| 37 | 1 | Lithium silicate colloid | C.I. Solvent Black 3 | 100/50/200 | " | 18 |

We claim:

1. A method of preventing polymer scale deposition in a polymerization vessel during polymerization of a monomer having an ethylenically double bond, wherein said polymerization is carried out in a polymerization vessel in which its inner wall has been previously coated with a coating solution comprising:
   (A) a condensate of a phenolic hydroxy group-containing compound, which comprises at least one member selected from the group consisting of (1) a self-condensation product of a polyhydric phenol, (2) a condensation product of two or more kinds of polyhydric phenols, and (3) a self-condensation product of a polyhydric naphthol.
   (B) at least one member selected from the group consisting of metal compounds and inorganic colloids, and
   (C) at least one member selected from the group consisting of dyes and pigments.

2. The method according to claim 1, wherein the component (A) comprises the self-condensation product of resorcinol.

3. The method according to claim 1, wherein the component (A) comprises the reaction product of pyrogallol and an aldehyde containing a unit in its molecule represented by the general formula:

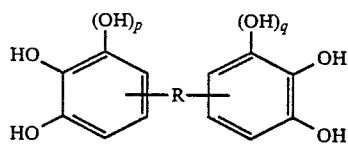

Wherein R represents a divalent hydrocarbon group having from 1 to 30 carbon atoms, and p and q are an integer of 0 or 1.

4. The method according to claim 3, wherein said reaction product is the one of pyrogallol with benzaldehyde.

5. The method according to claim 1, wherein the component (A) comprises the condensate of pyrogallol or a hydroxyhydroquinone with an aromatic aldehyde represented by the general formula:

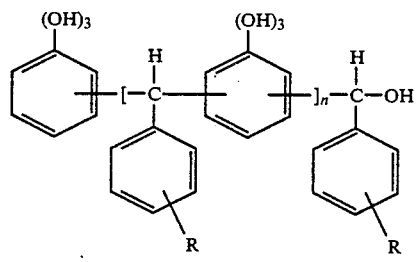

Wherein, R represents a hydrogen atom or an alkyl group having 1 to 10 carbon atoms and n is an integer of 0 or more.

6. The method according to claim 1, wherein the component (A) comprises the compound represented by the formula:

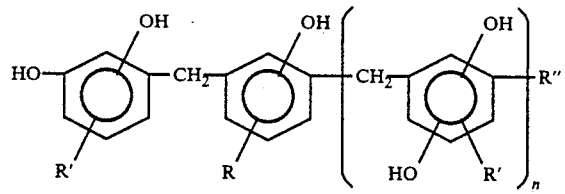

Wherein R represents a halogen atom or an alkyl group having 1 to 4 carbon atoms, R' represents a member selected from the group consisting of a hydrogen atom, a halogen atom, a hydroxyl group and alkyl groups having 1 to 4 carbon atoms, R" represents a member selected from the group consisting of a hydrogen atom and the group: —$CH_2OH$, and n is an integer of from 1 to 20.

7. The method according to claim 1, wherein the component (B) comprises at least one member selected from the group consisting of silicates of magnesium, calcium, aluminum and titanium; phosphates of magnesium, calcium, barium and titanium; sulfates of titanium, tin, iron and nickel; hydroxides of magnesium, calcium, aluminum and iron; and colloids of ferric hydroxide, aluminum hydroxide, stannic acid, silicic acid, aluminum hydroxide, and lithium silicate.

8. The method according to claim 1, wherein the component (C) comprises a quinoneimine dye.

9. The method according to claim 1, wherein the coating solution contains the component (B) in an amount of from 1 to 500 parts by weight and the component (C) in an amount of from 5 to 400 parts by weight per 100 parts by weight of the component (A).

10. The method according to claim 1, wherein the coating solution contains the components (A), (B) and (C) in a concentration of from 0.001 to 5 % by weight.

11. The method according to claim 1, wherein said coating solution has been previously applied to parts of the polymerization vessel with which the monomer comes into contact during polymerization other than its inner wall surface and then dried to form a coating.

12. The method according to claim 11, wherein said parts with which the monomer comes into contact are selected from the group consisting of a stirring shaft, stirring blade, baffle, header, search coil and condenser.

13. The method according to claim 1, wherein the coating formed has a coating weight of from 0.001 to 5 g/m².

14. The method according to claim 1, wherein the monomer is at least one member selected from the group consisting of vinyl halides; vinyl esters; acrylic acid and methacrylic acid, or esters or salts of these; maleic acid or fumaric acid, and esters or anhydrides thereof; diene monomers; aromatic vinyl compounds; acrylates; acrylonitrile; halogenated vinylidenes; and vinyl ethers.

15. The method according to claim 1, wherein said polymerization is carried out as suspension polymerization, emulsion polymerization, solution polymerization or bulk polymerization.

16. A polymer scale preventive agent comprising:
(A) a condensate of a phenolic hydroxy group-containing compound, which comprises at least one member selected from the group consisting of (1) a self-condensation product of a polyhydric phenol, (2) a condensation product of two or more kinds of polyhydric phenols, and (3) a self-condensation product of a polyhydric naphthol,
(B) at least one member selected from the group consisting of metal compounds and inorganic colloids, and
(C) at least one member selected from the group consisting of dyes and pigments.

17. A polymerization vessel whose inner wall has been coated with a coating solution comprising:
(A) a condensate of a phenolic hydroxy group-containing compound, which comprises at least one member selected from the group consisting of (1) a self-condensation product of a polyhydric phenol, (2) a condensation product of two or more kinds of polyhydric phenols, and (3) a self-condensation product of a polyhydric naphthol,
(B) at least one member selected from the group consisting of metal compounds and inorganic colloids, and
(C) at least one member selected from the group consisting of dyes and pigments.

18. The agent according to claim 16, wherein component (A) comprises the reaction product of pyrogallol and an aldehyde containing a unit in its molecule represented by the general formula:

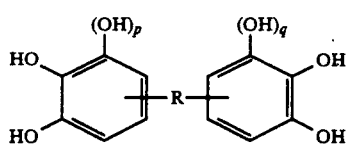

wherein R represents a divalent hydrocarbon group having from 1 to 30 carbon atoms, and p and q are an integer of 0 or 1.

19. The agent according to claim 16, wherein component (A) comprises the condensate of pyrogallol or a hydroxyhydroquinone with an aromatic aldehyde represented by the general formula:

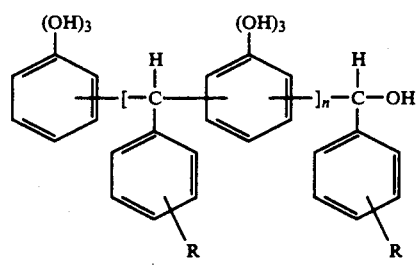

wherein R represents a hydrogen atom or an alkyl group having 1 to 10 carbon atoms and n is an integer of 0 or more.

20. The agent according to claim 16, wherein component (A) comprises the compound represented by the formula:

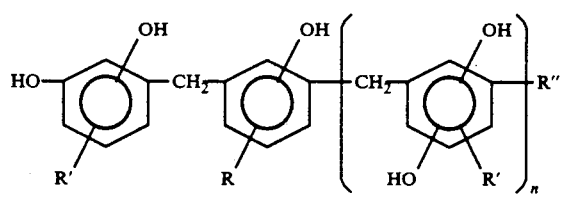

wherein R represents a halogen atom or an alkyl group having 1 to 4 carbon atoms, R' represents a member selected from the group consisting of a hydrogen atom, a halogen atom, a hydroxyl group and alkyl groups having 1 to 4 carbon atoms, R" represents a member selected from the group consisting of a hydrogen atom and the group: —CH$_2$OH, and n is an integer of from 1 to 20.

21. The vessel according to claim 17, wherein component (A) comprises the reaction product of pyrogallol and an aldehyde containing a unit in its molecule represented by the general formula:

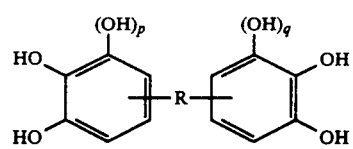

wherein R represents a divalent hydrocarbon group having from 1 to 30 carbon atoms, and p and q are an integer of 0 or 1.

22. The vessel according to claim 17, wherein component (A) comprises the condensate of pyrogallol or a hydroxyhydroquinone with an aromatic aldehyde represented by the general formula:

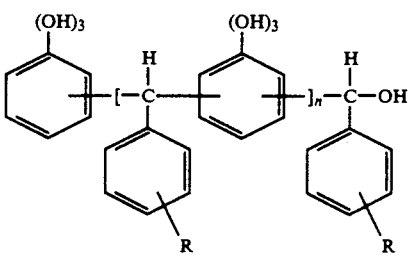

wherein R represents a hydrogen atom or alkyl group having 1 to 10 carbon atoms and n is an integer of 0 or more.

23. The vessel according to claim 17, wherein component (A) comprises the compound represented by the formula:

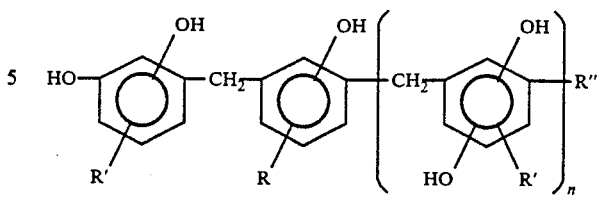

wherein R represents a halogen atom or an alkyl group having 1 to 4 carbon atoms, R' represents a member selected from the group consisting of a hydrogen atom, a halogen atom, a hydroxyl group and alkyl groups having 1 to 4 carbon atoms, R" represents a member selected from the group consisting of a hydrogen atom and the group: —$CH_2OH$, and n is an integer of from 1 to 20.

* * * * *